Dec. 5, 1950 P. S. COMBS 2,532,661
MONORAIL WHEEL
Filed June 22, 1945 3 Sheets-Sheet 1
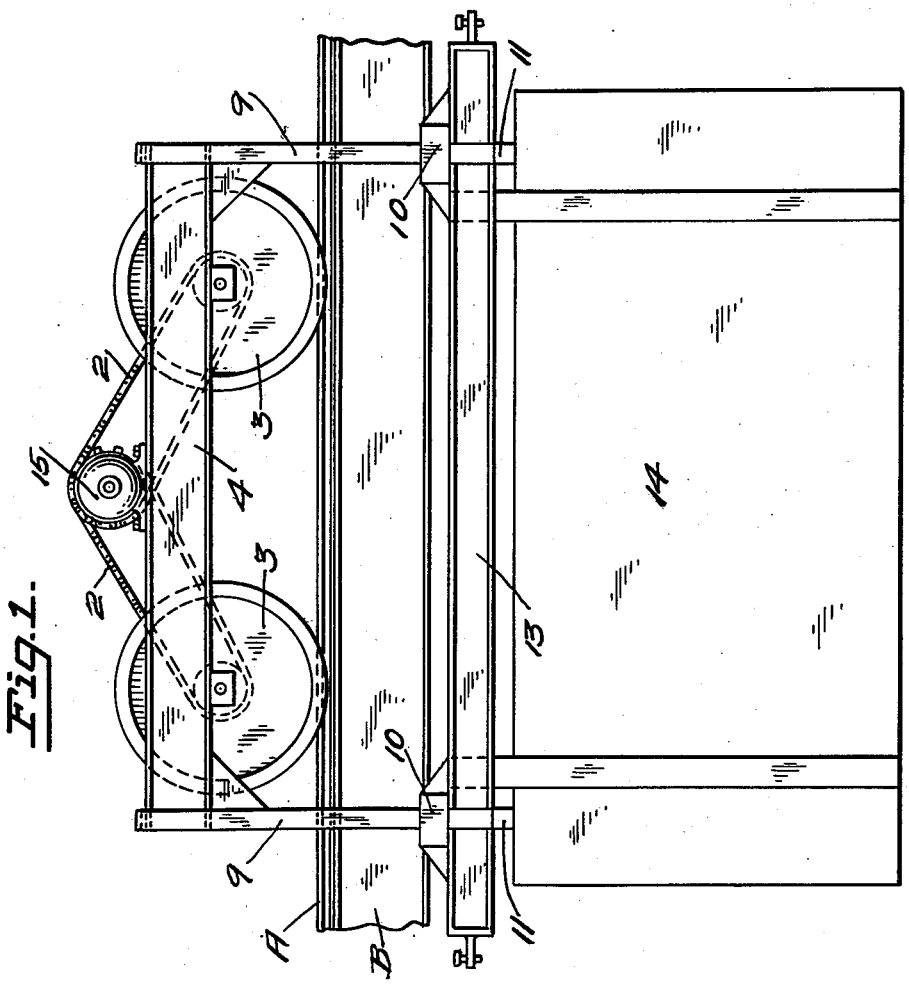
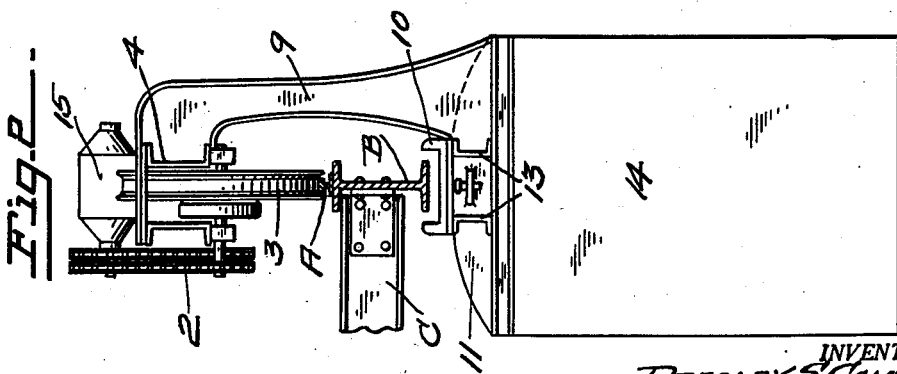
INVENTOR.
PRESLEY S COMBS.
BY
Thomas Castberg.
Atty.

Dec. 5, 1950 P. S. COMBS 2,532,661
MONORAIL WHEEL

Filed June 22, 1945 3 Sheets-Sheet 3

INVENTOR.
PRESLEY. S. COMBS.
BY
Thomas Astberg
Atty.

Patented Dec. 5, 1950

2,532,661

UNITED STATES PATENT OFFICE 2,532,661

MONORAIL WHEEL

Presley S. Combs, Los Angeles, Calif., assignor to P. S. Combs and Anson S. Bilger, both of Los Angeles, Calif., as trustees Application June 22, 1945, Serial No. 600,973

2 Claims. (Cl. 105—150)

This invention relates to a monorail system of the suspended type and especially to the shape and structure of the wheels which ride the monorail and from which the rolling stock and load to be transported is suspended.

The object of the present invention is generally to improve and simplify the construction and operation of wheels of the character described; to provide a wheel for use in conjunction with a monorail system which will insure safety and economy under all conditions of service and speed; to provide a wheel which permits perfect natural banking by pendulum action when rounding curves and which is substantially free from flange friction, vibration, or sliding movement on straight-way tracks and when rounding curves, and which is capable of taking curves of an exceedingly small radius; and further, to provide a wheel which tends at all times to climb and center itself with relation to the rail upon which it travels.

The invention is shown by way of illustration in the accompanying drawings in which:

Fig. 1 is a side elevation of a portion of the monorail and a car suspended therefrom;

Fig. 2 is an end view of the same, viewed from the left of Fig. 1;

Figure 3:
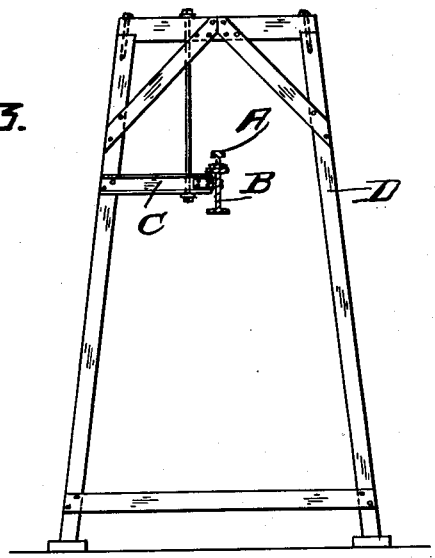
Fig. 3 is a front view of one form of tower or standard that may be employed to support the monorail.

Referring to the drawings in detail and especially Figs. 1, 2 and 3, A indicates a standard rail welded or otherwise secured to a beam B which in turn is secured to a cross arm C carried by suitably spaced standards or towers, one of which is indicated at D (see Fig. 3).

Supported by wheels 3 riding on the track is the truck 4 and suspended from the truck by a pair of hanger arms 9 is a car 14 which may be constructed to carry passengers, freight, or otherwise. Gusset braces 11 extend cross-wise of the top of the car and beams 13 longitudinally thereof. These cooperate to form a rigid connection between the car and the hanger arms, and also to form a support for a swing gage 10 whereby pendulum swing or sway of the car when acted upon by wind pressure or when rounding curves is limited or controlled.

Power in the form of an internal combustion engine, an electric motor, or otherwise, to drive the car may be carried by the truck as indicated at 15 and transmits power to the wheels 3 in any suitable manner as by the chain drive indicated at 2.

Figure 4:
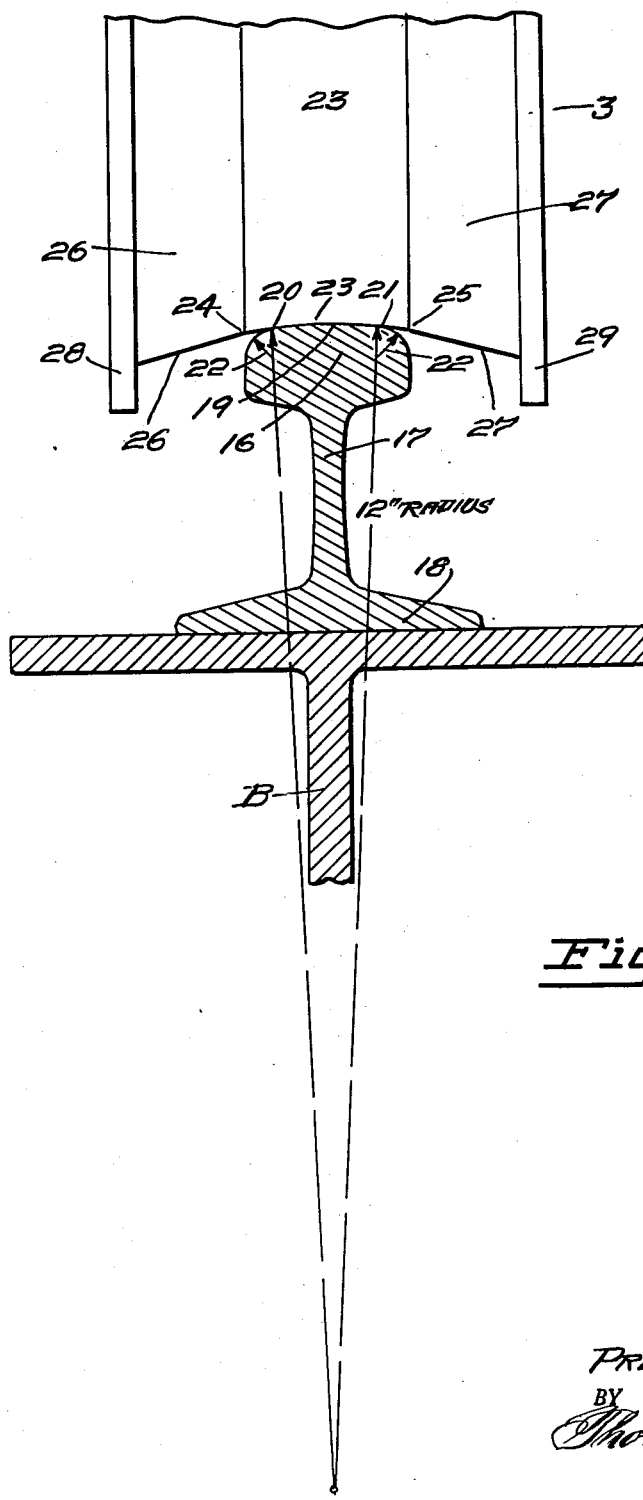
Fig. 4 is an enlarged view of the monorail and a portion of a wheel riding thereon.

The invention as previously stated is particularly directed to the wheels 3 and before submitting a detailed description thereof, it is desired to emphasize the fact that the rail A upon which the wheels travel is a standard form of rail such as employed in general railway service. Such rails comprise a head portion 16 (see Fig. 4), a web 17 and a base 18. In the present instance let it be supposed that a standard thirty-pound rail is used. If that is the case, it will be found that the upper face presents a curved surface 19 and that the radius of this curve is twelve inches. This radius increases with increase of size and weight of rails, and conversely decreases as the rail size decreases. The exact radius is not important, but it is important that the surface of the wheel 3 which contacts or rides on the rail be curved and that the curve be complementary to the surface of the rail, as will hereinafter appear.

The curved upper surface 19 of the rail head represented by the twelve inch radius extends from the point 20 to the point 21 and no further as the opposite sides of the rail head are sharply rounded off at these points on the radius indicated at 22. The total width of a thirty-pound rail head is approximately one and eleven-sixteenths inches and the portion thereof having the twelve inch radius is approximately three-fifths of the total width. The complementary curved surface 23 on the wheel 3 is extended to cover approximately the full width of the rail head or extends from the point 24 to the point 25. From these points the wheel presents angularly disposed annular faces such as indicated at 26 and 27 and these faces finally terminate in annular flanges 28 and 29. Due to the angularity of the faces 26 and 27 it may be said that a frustum of a cone is formed on each side of the central track engaging or riding surface 23 of the wheel and that the base or larger end of each frustum is disposed outermost. The angular disposition of the faces 26 and 27 is acute with relation to the axis of rotation of the wheel and in this instance is shown as being about fifteen degrees with relation to the axis of rotation of the wheel but the angle is not critical and may be more or less.

From the foregoing it is evident that the wheels employed have an annular rail contacting or riding portion 23 disposed centrally thereof with a cross sectional curvature complementary to the rail head surface and that said complementary surface is slightly wider than the rail head surface; further, that angular annular faces 26 and 27 are disposed on opposite sides of the track engaging portion and that these faces terminate in annular flanges 28 and 29.

The above structural features are important. For instance, if the complementary surface on the wheel has the same cross-sectional curvature as the top surface of the rail head, the wheels become self-tracking, or in other words tend at all times to climb and assume a central position on top of the rail, and as the central track engaging portion of the wheel is wider than the complementary surface on the rail, there would appear to be a pivotal movement between the wheel surface and the rail surface when the car swings as a pendulum, for instance when rounding a curve. That is, it would appear that the movement of the wheel with relation to the rail surface would be similar to a bearing which is partially rotated about a stationary shaft. If that were the case, there would be actual lateral sliding movement between the wheel surface and the rail surface which would result in heavy friction, wear and vibration, but that is not the case as the wheels are rolling over the surface of the rail when approaching and rounding a curve and the pendulum movement is gradual; hence, the wheel rolls from its vertical position to the final tilted position which it assumes due to pendulum action when rounding a curve, thus eliminating wear and vibration.

If for any reason a wheel should tend to leave the rail or assume a position where it commences to ride on either one or another of the angular annular surfaces 26 or 27, these surfaces would instantly direct the wheel back to its normal position as they function in a manner similar to the crown surface of a belt pulley, that is the crown surface of a pulley causes the belt to seek a central position thereon and so do the angular side faces of the wheel.

The angular side faces serve another function, to wit, that of preventing derailment because if a wheel should gradually ride outwardly on one of these faces, the diameter gradually becomes greater thereby lifting the truck 4 and the car 14 vertically with relation to the rail and as there is only a comparatively small vertical clearance between the swing gage 10 and the lower face of the track supporting beam B, it is obvious that the swing gage will engage the under surface before the wheel can climb a sufficient distance to permit derailing. Of course, there is further protection by providing the annular flanges 28 and 29 but these are actually not necessary as the swing gage engages the lower surface of the beam before these flanges are reached. It is for this reason that the flanges are actually unnecessary. In fact, they are only employed to promote greater safety.

In view of the foregoing, there can be no friction between the flanges 28 and 29 and the rail and there is no friction set up when rounding a curve. Hence, practically all sources of friction and vibration commonly encountered in standard railroad practice have been reduced to the vanishing point. This result is reflected to all rods, bolts and braces, for instance in the tower structures and supports as well as in the structure of the rolling stock and other equipment, thereby reducing power consumption, maintenance and replacements, not to speak of first cost as the size of structural members, bracing, foundations, etc., may obviously be less under such favorable operating conditions.

Figure 5:
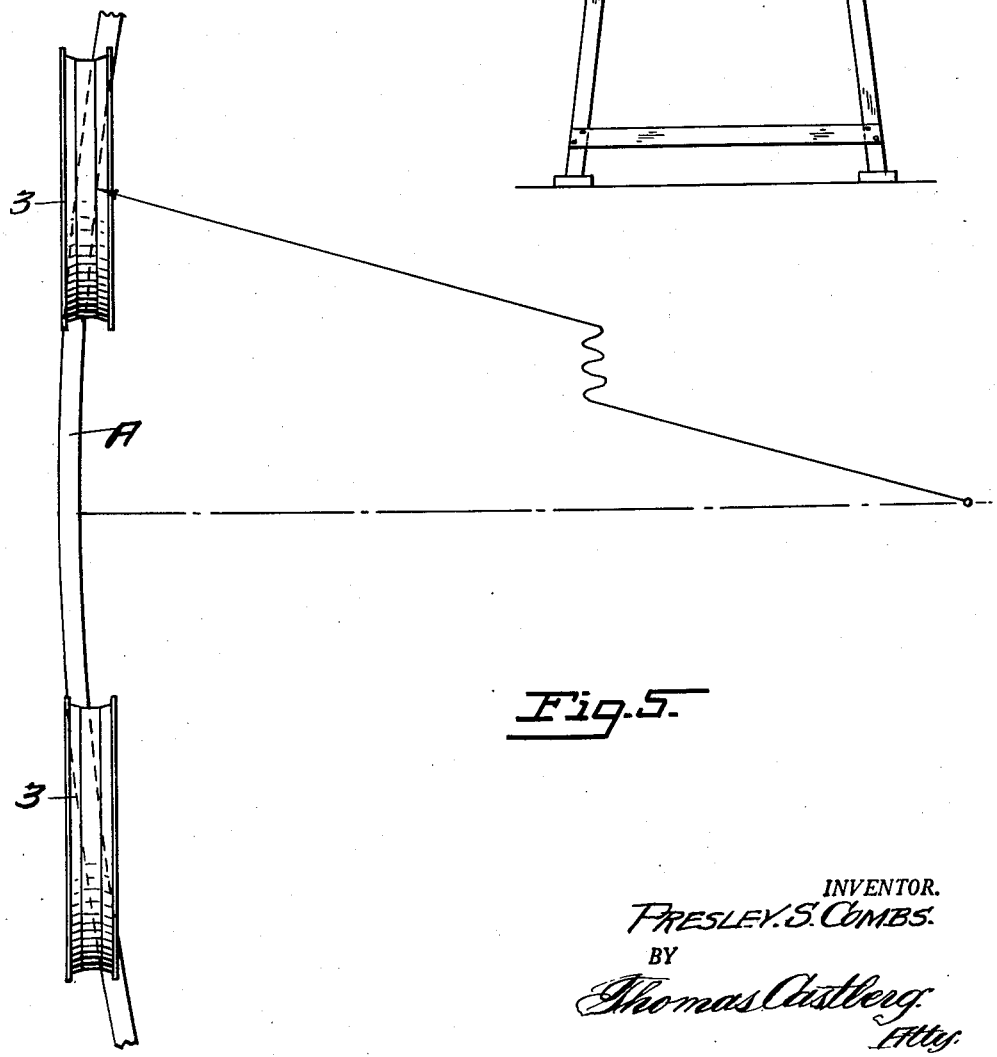
Fig. 5 is a plan view of a curved rail showing the position assumed by two wheels when rounding a curve.

Due to the complementary curved faces formed between the wheel and rail head, uniform traction is assured at all angles of the wheel with relation to the track both on straight-way and curves and natural banking due to pendulum action when rounding curves and also when acted upon by wind pressure is assured with a minimum of friction, vibration or sliding movement. The position of the wheels when rounding a curve is best shown in Fig. 5. Curves of exceedingly small radius may be traversed. The flanges 28 and 29 must not contact the sides of the rails when rounding a curve; hence, with curves of small radius the flange width must be governed accordingly. In Fig. 5 two wheels are shown as rigidly mounted one at each end of a truck. Obviously each wheel may be provided with a truck and each truck may be swiveled to a main truck and if this is the case the radius of the rail curve may be further shortened. The wheels may of course be mounted in anti-friction bearings. Their faces may be chill hardened. They may be made of a diameter to suit rails of different size, etc., and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. In a suspended monorail system of the character described, a railway rail having a head portion presenting a curved upper surface of a predetermined radius, a load-carrying wheel adapted to ride on said rail, said wheel presenting a central annular surface engaging the surface of and of substantially the same width as the rail and said surface having a radius substantially complementary to the radius of the rail surface, and a pair of secondary conical surfaces on the wheel, one on each side of the central surface and forming a continuation thereof, said secondary surfaces being disposed at acute angles with relation to the axis of rotation of the wheel and diverging away from said central surface.

2. In a suspended monorail system of the character described, a railway rail having a head portion presenting a curved upper surface of a predetermined radius, a load-carrying wheel adapted to ride on said rail, said wheel presenting a central annular surface engaging the surface of and of substantially the same width as the rail and said surface having a radius substantially complementary to the radius of the rail surface, a pair of secondary conical surfaces on the wheel, one on each side of the central surface and forming a continuation thereof, said secondary surfaces being disposed at acute angles with relation to the central axis of rotation of the wheel and diverging away from said central surface, annular flanges on each side of the wheel and exterior of the secondary conical surfaces, said annular flanges being disposed substantially at right angles to the axis of rotation of the wheel.

PRESLEY S. COMBS.

REFERENCES CITED

The following references are of record in the file of this patent:

UNITED STATES PATENTS

| Number | Name | Date |
| --- | --- | --- |
| 311,112 | Enos | Jan. 20, 1885 |
| 808,183 | Alexander | Dec. 26, 1905 |
| 1,003,950 | Rosada | Sept. 19, 1911 |
| 1,314,202 | Moore | Aug. 26, 1919 |
| 1,395,559 | Davis | Nov. 1, 1921 |
| 1,780,627 | Muller | Nov. 4, 1930 |